United States Patent Office.

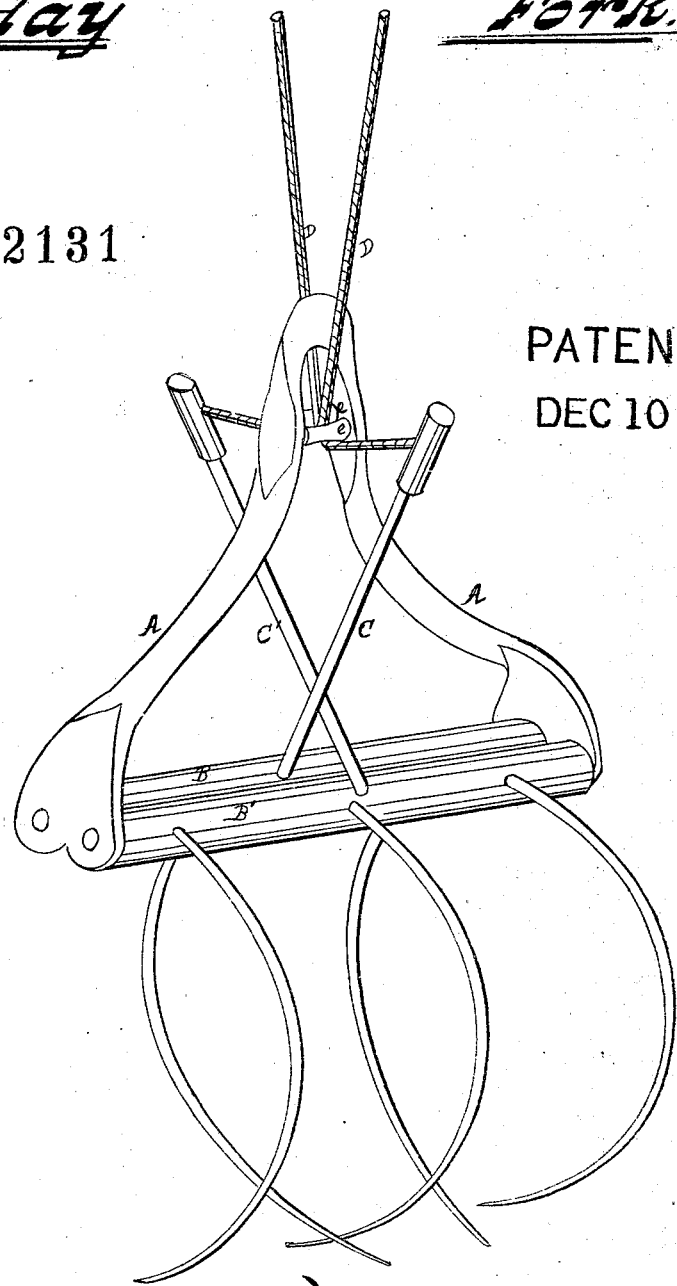

OLIVER VANORMAN, OF RIPON, WISCONSIN.

Letters Patent No. 72,131, dated December 10, 1867.

---

IMPROVEMENT IN HORSE HAY-FORKS.

---

The Schedule referred to in these Letters Patent and making part of the same.

---

TO ALL WHOM IT MAY CONCERN:

Be it known that I, OLIVER VANORMAN, of Ripon, in the county of Fond du Lac, and in the State of Wisconsin, have invented certain new and useful Improvements in Hay-Forks; and do hereby declare that the following is a full, clear, and exact description thereof, reference being had to the accompanying drawings, and to the letters of reference marked thereon.

In the annexed drawings, making part of this specification, B B' represent two rake-heads, which are placed close together and parallel, their axles having bearings in the ends of the triangular frame A, as seen. C C' represent two arms, which are secured permanently at one end to the rake-heads B B', and which cross each other, with their loose ends extending up almost to the top of the frame A. A represents a frame, which may be made of wood or metal, and in triangular form. B B', the rake-heads, form one side of this triangle. The other two sides are curved, as seen; and near where they join, two rollers, $e\ e$, are placed and secured between them. D D represent two cords, which are secured at one end to the loose ends of arms C C', their other ends passing up between the rollers $e\ e$. The rake-heads B B' are provided with rake-teeth, which curve in toward each other.

The cords D may be passed over a suitable pulley above the point where it is intended to convey the hay; and by them the frame is raised and lowered with its load.

To raise hay with this fork, the frame A is lowered by the cords D, and, the teeth of the heads B B' being extended, hay is placed between them. When a sufficient quantity has been introduced, the frame is drawn up by the cords D. As the cords begin to draw, they force together the loose ends of the arms C C', thus causing the teeth to clamp the hay tightly between them. As soon as the hay is raised to the required position, the cords D are loosened or dropped slightly, so as to allow the teeth to open and deposit the hay.

Having thus fully described my invention, what I claim as new, and desire to secure by Letters Patent, is—

The arrangement of the fork-heads B B' in the frame A, and with the arms C C', rollers $e\ e$, and cords D D, as and for the purpose set forth.

In testimony that I claim the foregoing, I have hereunto set my hand, this 28th day of August, 1867.

OLIVER VANORMAN.

Witnesses:
HARVEY DODGE,
C. F. DODGE.